July 23, 1935.   C. M. ELLENBERGER   2,009,311
AUTOMATIC LOCKING DEVICE FOR BRAKE LEVERS AND THE LIKE
Filed March 29, 1933   3 Sheets-Sheet 3

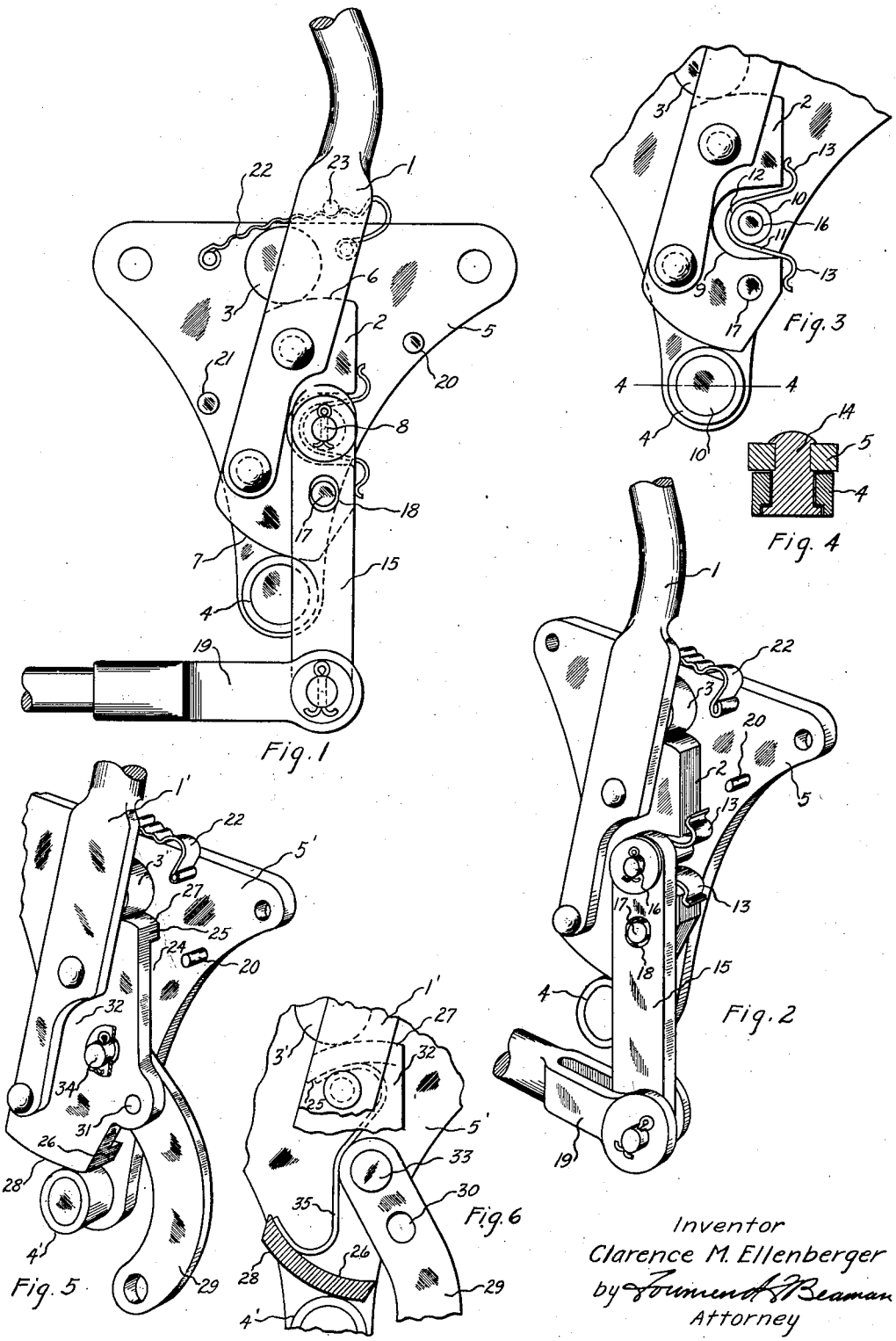

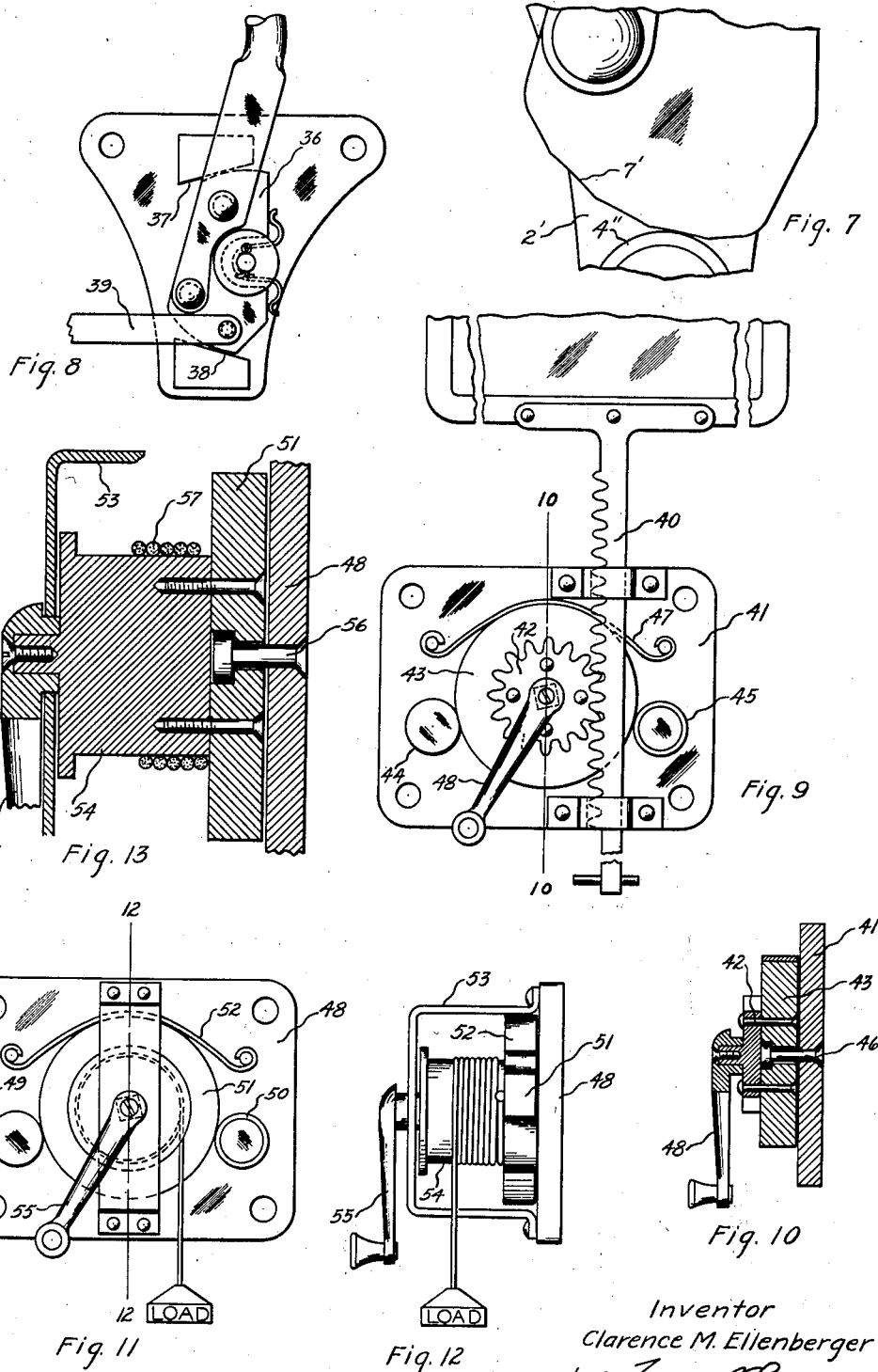

INVENTOR
Clarence M. Ellenberger
BY
Braselton, Whitcomb Davies
ATTORNEY

Patented July 23, 1935

2,009,311

UNITED STATES PATENT OFFICE 2,009,311

AUTOMATIC LOCKING DEVICE FOR BRAKE LEVERS AND THE LIKE

Clarence M. Ellenberger, Jackson, Mich.

Application March 29, 1933, Serial No. 663,400

21 Claims. (Cl. 192—8)

The present invention relates generally to mechanisms for releasably locking in an unlimited number of positions, operating mechanisms released under a resisting load.

It is the primary object of my invention to effect economies in construction and facilitate the ease of manipulation of operating mechanisms in which herebefore it has been considered necessary to employ releasable pawls, dogs, catches, pins, and the like to prevent uncontrolled retroactive operation. I am aware that locking mechanisms of the general class of those herein described have been developed. However, for the most part such prior constructions are cumbrous, expensive, and do not readily adapt themselves to general application.

Other objects and advantages of my invention reside in the novel features of construction and combination and arrangement of parts as will be more fully related. The invention is clearly defined and pointed out in the claims.

As will be readily apparent from the following disclosure my invention is capable of broad application. In the explanation of my invention it has been thought advisable to consider its principles of operation in detail as applied to one specific embodiment, namely, the emergency brake lever of an automotive vehicle; following this with relatively brief descriptions of several further exemplary applications of the principles of the invention.

In the accompanying drawings, wherein several possible modifications of my invention are shown for the purpose of illustration:

Fig. 1 is a front elevation of a brake lever assembly embodying the invention.

Fig. 2 is a perspective view of the lever shown in Fig. 1.

Fig. 3 is a fragmentary view of the lever shown in Fig. 1 with the arm connected to the actuated load removed.

Fig. 4 is a cross sectional view taken on line 4—4 of Fig. 3 of a detail of the construction.

Fig. 5 is a perspective view similar to Fig. 2 of a modified form of lever construction.

Fig. 6 is a broken view of a portion of the lever shown in Fig. 5.

Fig. 7 is a fragmentary view of a slightly modified type of locking member.

Fig. 8 is a further modification of my invention in its simpler form as applied to a lever construction.

Fig. 9 is a broken front elevation of the principle of the invention as applied to a rack and pinion operated load.

Fig. 10 is a cross sectional view taken on line 10—10 of Fig. 9.

Figs. 11 and 12 are front and side elevations, respectively, of a still further modification of my invention.

Fig. 13 is a cross sectional view taken on line 12—12 of Fig. 11.

Figure 14:
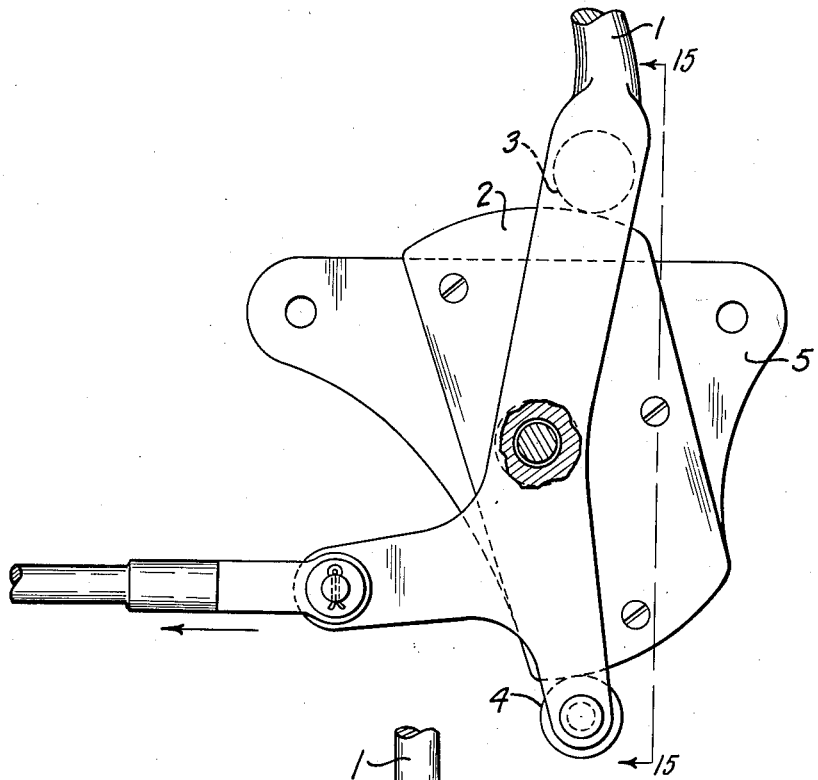
Fig. 14 is a side elevation of a further modification of my invention.

Generally considered, my invention resides in supporting a locking member of suitable description in a bearing of a character permitting relative movement of the locking member during load manipulation yet resisting relative movement when the locking member is urged to a firmer seat in the bearing under the influence of a load released by the load operating mechanism. As will be apparent from the illustrations in the drawings, the manipulation of the load by the operating means may be effected directly through the locking member or the locking member may be subordinate to the means for manipulating the load yet movable as a unit therewith.

In order that the invention may be clearly understood attention is directed to Fig. 1 of the drawings wherein a brake lever assembly especially adapted for automotive vehicles is illustrated. At the present considerable difficulty is experienced, especially by women, in the releasing of the dog or pawl retaining the emergency brake in a load locking position. In the present invention this difficulty has been overcome by securing the manually operated lever I to a locking member 2 which may be considered as fulcrumed or journaled between two spaced bearing surfaces 3—4 supported normally from the frame 5. The locking member 2 is shown as having curvilinear portions 6—7 which in some cases may be arcs of circles having a common center as at 8. I do not wish to be limited to any particular configuration of the locking member 2, as in the preferred form the member 2 is turnable about a free axis and the location of the axis may change during the manipulation of the member 2 by the lever 1. It is sufficient for the purpose of the invention that the configuration of the member 2 and the surfaces 3—4, permit the member 2 to be readily manipulated in engagement with the surfaces 3—4 and urged to a load locking seat therewith in all positions.

As more clearly shown in Fig. 3 the member 2 is recessed at 9 to freely accommodate a stud 10 supported from the frame 5. A U-shaped spring 11 bears against the stud 10 at 12 and resiliently urges the member 2 into engagement with the surfaces 3—4. As shown, the surfaces 3—4 are cylindrical in shape to facilitate manufacturing. Preferably, one of the spaced bearing surfaces such as 4 is rotatably supported on a trunnion 14 as shown in Fig. 4. Obviously, any other well known type of anti-friction bearing surfaces may be employed in lieu of one shown at 4. It is also to be understood that the configuration of the surfaces 3—4 may be innumerable as is evident by reference to Fig. 8; it being only essential that the angularity of tangents at the points of engagement between the bearing surfaces and the locking member 2 will be sufficient under the urge of the load to create sufficient wedging action to lock the load in any position.

An arm 15 is pivoted upon an end portion 16 of the stud 10 and retained in position in any suitable manner. As shown, the arm bridges the recess 9 and as it is in direct contact with one face of the member 2, it tends to guide the member 2 for movement in a plane. A pin 17 affixed to the member 2 is loosely engaged with a slot 18 located in the arm 15. This loose connection permits the member 2 to turn upon a free axis independent of the axis about which the arm 15 swings. The arm 15 is connected to a member 19 which in the case of a brake lever assembly would extend to the brake mechanism. In this manner the size of the locking member 2 may be reduced to a minimum and the necessary throw of the member 19 provided through the arm 15. At the same time a component of the actuated load is directed through the pin 17 to urge the member 2 to a wedging seat as will be hereinafter described. Obviously, other methods of multiplying the movement of the member 2 will readily occur to those skilled in the art. Stops 20—21 limit the throw of the lever 1 through contact with the member 2.

The operation of the foregoing structure follows: Under the influence of a resisting load, a component of the load directed through the pin 17 will urge the locking member 2 to a firmer seat in its bearing. The tendency for the member 2 to rotate about an axis is overcome by the friction between engaging surfaces with the result that the member 2 is wedged between the spaced bearing surfaces locking the load in position. When the lever 1 is moved to the left to further manipulate the load, initial movement results in the fulcrumage of the member 2 about the surface 3 until the wedging pressure has been sufficiently reduced between the engaging surfaces to permit the member 2 to turn about some axis. It is to be understood that the member 2 remains in engagement with the surfaces 3—4, the pressure being merely reduced between the engaging surfaces. Upon release of the lever 1 in any position to the load, the member 2 is in a load locking position. When the lever 1 is moved to the right to relieve the load, initial movement results in the fulcruming of the member 2 about the surface 4 until the wedging pressure has been sufficiently reduced to permit relative movement between the surfaces.

If desired, the movement of the member 2 may be indexed through a corrugated spring member 22 supported from the frame 5 and engaged by a pin 23 located on the lever 1.

In the modifications shown in Figs. 5 and 6, the lever multipying the movement of the locking member is located in the plane of the engaging surfaces. This is accomplished by an undercut as at 24 resulting in shoulder portions 25—26 presenting curvilinear surfaces 27—28 engaging the surfaces 3'—4'. An arm 29 connected to the load has loose slot and pin connections at 30—31 with the locking member 32 and is pivoted to a stud 33 supported in the frame 5'. The end of the stud 33 is reduced at 34 and is loosely engaged in an aperture located in the member 32. This permits the member 32 to turn about a free axis and to be urged to a wedging seat in the manner identical with the assembly shown in Figs. 1 to 3, inclusive. A spring 35 is located in the undercut 24 and urges the surfaces 27—28 into engagement with the surfaces 3'—4' similar to the spring 11.

If desired the surface of the locking member may be provided with a series of irregularities which may take, for example, the forms of plane or flat portions, grooved, notched or even arcuate portions, engageable with the rotatable bearing surface. These irregularities are of slight dimension and aside from increasing the locking action imparting an indexing action to the lever which is usually desired by the operator. As shown in Fig. 7, the locking member 2' is provided with a surface 7' engageable with the rotatable surface 4''. The surface 7' is constituted of a series of plane or flat portions which may be the result of a coining operation. As the surface 4'' rolls over the high points a definite indexing is attained. With this type of locking member the spring 22 in Fig. 1 may be eliminated.

My invention in its simplest form is shown in Fig. 8. Here the locking member 36 is engaged in a V-bearing constituted by fixed spaced sloping surfaces 37—38. The load actuating arm 39 is directly connected to the member 36. The operation is fundamentally the same as hereinbefore described.

In Fig. 9 the load, for example, the window of an automotive vehicle, is operated through a rack and pinion mechanism. The rack 40 is guided in a frame 41; while the pinion is affixed to a circular locking member 43 supported between and engaging spaced bearing surfaces 44—45 supported on the frame 41. As shown in Fig. 10, the member 43 is loosely guided on a stud 46 to permit the same to be urged at all times to a wedging seat with the surfaces 44—45 by the load in a manner as has been herebefore described with reference to Figs. 1 to 6, inclusive. Preferably, a flat spring member 47 is employed to assist in positioning the member 43 and to urge the same into engagement with the surfaces 44—45. A handle 48 may be employed to rotate the pinion 42 and member 43 as a unit.

My invention is shown in Figs. 11 to 13, inclusive, applied to a cable and drum load actuating mechanism. The frame 48 supports spaced bearing surfaces 49—50 upon which a circular locking member 51 is supported for rotation. A spring 52 guides and urges the member 51 to a seat in a manner similar to the spring 47. As shown in Fig. 13, a U-shaped bracket 53 supported from the frame 48 acts as a front bearing for a drum 54 which is rotated as a unit with the locking member 51 by the handle 55. The member 51 is loosely guided by a stud 56 supported in the frame 48. Through a cable 57 the load is manipulated upon rotation of the drum 54 in a well known manner. In view of the load being suspended between the spaced bearing surfaces 49—50, it is constantly urging the locking member into a wedging seat locking the load in any position of release upon cessation of load manipulating through the handle 55.

Figure 15:
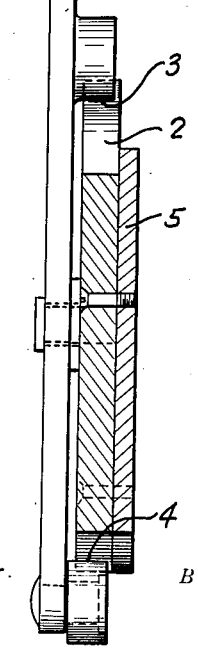
Fig. 15 is a cross sectional view taken on line 15—15 of Fig. 14.

Only a few of the possible applications of the invention have been illustrated. I contemplate innumerable other modifications of the construction but it is thought that with the foregoing disclosures those skilled in the art will be able to resort to these modifications without departing from the scope of my invention. For example, as illustrated in Figures 14 and 15 the locking bar 2 may be affixed to the frame 5 and the surfaces 3—4 made movable as a unit with the lever 1 in engagement with the bar 2 and urged to a wedging seat therewith by the load which in such a case would be actuated by the movement of the lever in lieu of the locking bar. It is readily apparent that such changes and modifications will readily occur to those skilled in the art and I do not desire to be limited to the exact details heretofore described, but intend to include as part of my invention all such changes and modifications as fall within the scope of the appended claims.

Having described my invention, what I claim as new and desire to protect by Letters Patent is:

1. A brake lever assembly or the like comprising a supporting frame having spaced bearing surfaces, a locking bar having curvilinear portions in constant engagement with said surfaces, an operating member carried by said locking bar for at least partially rotating said bar about an axis located slightly to one side of a plane through the points of engagement of said bar and surfaces, an arm pivoted to said frame and adapted to be operatively connected with the actuated load, interconnections between said arm and bar for actuating the load upon rotation of the latter, said interconnections directing a component of the load between the points of engagement of said bar and surfaces urging said bar to a wedging seat resisting rotation of said bar by the load, whereby the load is locked in any position of rotation of the bar by the operating member.

2. A brake lever assembly or the like as described in claim 1, at least one of the spaced bearing surfaces being rotatably supported to effect a rolling engagement with the locking bar.

3. A brake lever assembly or the like as described in claim 1, comprising additional means contacting with and constantly urging said bar to a seat in said spaced bearing surfaces.

4. A brake lever assembly or the like as described in claim 1, comprising means for indexing the rotation of said bar by said operating member.

5. A device of the character disclosed, comprising a supporting frame; spaced bearing surfaces supported from said frame; a locking lever having portions thereof in constant engagement with said surfaces, said lever having a handle portion and adapted to effect relative movement between said locking lever and surfaces, said locking member being loosely pivoted to said frame; means adapted to operatively connect the locking member with the actuated load, whereby a component of load between the points in engagement of said member and surfaces urges said member to a wedging seat, resisting rotation of the member by the load whereby the load is locked in any position in which the locking member is moved.

6. A brake lever assembly or the like comprising a supporting frame having spaced bearing surfaces, a locking bar having portions thereof in engagement with said surfaces, means engaging the locking bar for constantly urging said bar into engagement with said surfaces, an operating member for effecting relative movement between said bar and surfaces, means adapted to be operatively connected with the actuated load, interconnections between said means and bar for actuating the load upon movement of the latter, said interconnections directing a component of the load between the points of engagement of said bar and surfaces urging said bar to a wedging seat resisting rotation of the bar by the load, whereby the load is locked in any position to which the bar is moved by the operating member.

7. A brake lever assembly or the like comprising a supporting frame having spaced bearing surfaces, a locking bar loosely pivoted on said frame and having portions thereof in engagement with said surfaces, an operating member for effecting relative movement between said bar and surfaces, means adapted to be operatively connected with the actuated load, interconnections between said means and bar for actuating the load upon movement of the latter, said interconnections directing a component of the load between the points of engagement of said bar and surfaces urging said bar to a wedging seat resisting rotation of the bar by the load, whereby the load is locked in any position to which the bar is moved by the operating member.

8. A brake lever assembly or the like comprising a supporting frame, having spaced bearing surfaces, a locking bar having portions thereof in engagement with said surfaces, an operating member for effecting relative movement between said bar and surfaces, means adapted to be operatively connected with the actuated load, interconnections between said means and bar for actuating the load upon movement of the latter, said interconnections directing a component of the load between the points of engagement of said bar and surfaces urging said bar to a wedging seat resisting rotation of the bar by the load, whereby the load is locked in any position to which the bar is moved by the operating member, at least one of said spaced bearing surfaces being rotatably supported to effect rolling engagement with said locking bar.

9. A brake lever assembly or the like comprising a supporting frame having spaced bearing surfaces, locking means having portions in engagement with said surfaces, said means being capable of movement relative to said surfaces yet adapted to be urged to a seat therewith resisting such movement, operating means for effecting movement of said first means, means adapted to be operatively connected with the actuated load, said last means having connections with said locking means urging the same under the stress of the load to a seat resisting movement by the load, whereby the load is locked in any position to which the locking means is moved by the operating means, and means indexing the movement of said locking means by said operating means.

10. A brake lever assembly or the like comprising a supporting frame having spaced bearing surfaces, locking means having portions in engagement with said surfaces, said means being capable of movement relative to said surfaces yet adapted to be urged to a seat therewith resisting such movement, operating means for effecting movement of said first means, means adapted to be operatively connected with the actuated load, said last means having connections with said locking means urging the same under the stress of the load to a seat resisting movement by the load, whereby the load is locked in any position to which the locking means is moved by the operating means, means resiliently urging said locking means into engagement with said surfaces, and means indexing the movement of said locking means by said operating means.

11. A brake lever mechanism comprising a manually operated lever, a rigid member movable as a unit with said lever having substantially diametrically opposed arcuate surface portions, a frame member having rigidly spaced surfaces with which said portions engage as a bearing, said rigid member being turnable in said bearing about a free axis located at one side of a plane through the points of engagement of said surfaces and portions, means associated with said rigid member adapted to engage a resisting load, a component of said resisting load being effective in a plane located between said points of engagement to wedge said surfaces and portions into load locking position in all positions of said member upon release of said lever.

12. A brake lever mechanism comprising a manually operated lever, a member having arcuate spaced portions, means constituting a V-bearing with which said portions engage at spaced points, said lever and member being turnable as a unit in said V-bearing about a free axis, means associated with said unit adapted to engage a resisting load, a component of said resisting load being effective in a plane located between said spaced points to wedge said member in said bearing in a load locking position, said wedging action being readily overcome by said lever.

13. In a device of the character described, the combination with a fulcrumage constituted by spaced bearing surfaces, of operating mechanism for effecting a mechanical movement including spaced surfaces rotatable in engagement with said first surfaces about a free axis, the relationship of said engaging surfaces being of a character to effect increasing resistance to relative movement upon being urged into firmer engagement, means operatively connected to said mechanism adapted to engage a resisting load, said last means under the influence of said load urging said mechanism into load lock engagement with said fulcrumage upon release of the operating mechanism.

14. In a device of the character described, the combination with a fulcrumage constituted by spaced cylindrical bearing surfaces one of which is rotatably supported, of operating mechanism for effecting a mechanical movement including spaced surfaces rotatable in engagement with said first surfaces about a free axis, the relationship of said engaging surfaces being of a character to effect increasing resistance to relative movement upon being urged into firmer engagement, means operatively connected to said mechanism adapted to engage a resisting load, said last means under the influence of said load urging said mechanism into load lock engagement with said fulcrumage upon release of the operating mechanism.

15. In a mechanism for actuating and locking a load in unlimited positions, the combination with a support having spaced bearing surfaces, of a circular locking member engaging said surfaces being of slightly greater diameter than the spacing thereof, means for rotating said member about a free axis in engagement with said surfaces, load actuating means rotatable with said member as a unit, a component of the load urging said member to a wedging seat with said surfaces resisting rotation of the same by the load, whereby the load is locked in any position to which said member is rotated by said first means.

16. In a mechanism for actuating and locking a load in unlimited positions, the combination with a support, of a circular locking member supported therein for rotation about a free axis, means for rotating said member, load actuating means rotatable with said member as a unit, a component of the load urging said member to a seat in said support resisting rotation of the same by the load, whereby the load is locked in any position to which said member is rotated by said first means.

17. In a mechanism for actuating and locking a load in unlimited positions, the combination with a support having spaced bearing surfaces, of a circular locking member supported between said surfaces and in engagement therewith for rotation about a free axis, means for rotating said member, means for guiding said member in its rotation including resilient means urging the same into engagement with said surfaces, load actuating means rotatable with said member as a unit, a component of the load urging said member to a seat in said support resisting rotation of the same by the load, whereby the load is locked in any position to which said member is rotated by said first means.

18. In a mechanism for actuating and locking a load in unlimited positions, the combination with a support having spaced cylindrical bearing surfaces, of a circular locking member engaging said surfaces being of slightly greater diameter than the spacing thereof, means for rotating said member about a free axis in engagement with said surfaces, load actuating means rotatable with said member as a unit, a component of the load urging said member to a wedging seat with said surfaces resisting rotation of the same by the load, whereby the load is locked in any position to which said member is rotated by said first means, one of said bearing surfaces being of an anti-friction type.

19. A brake lever assembly or the like comprising a supporting frame, spaced bearing surfaces supported from said frame, locking means having portions in engagement with said surfaces, said means being capable of movement relative to said surfaces yet adapted to be urged to a seat therewith resisting such movement, operating means for effecting movement of said first means, means adapted to be operatively connected with the actuated load urging said locking means under the stress of the load to a seat resisting movement by the load, a portion of said locking means engaging one of the bearing surfaces being irregular to effect an indexing of the movement of the locking means.

20. A brake lever assembly or the like comprising a supporting frame having spaced bearing surfaces, one of which is rotatable about a fixed axis, a locking member having a uniform curvilinear portion engaging one of said surfaces and a generally curvilinear surface provided with surface irregularities engaging said rotatable surface, said locking member being capable of movement relative to said surface yet adapted to be urged to a seat therewith resisting movement, an operating member for effecting movement between said engaging surface, means, adapted to be connected to a load, associated with said member and urging the same to a seat resisting relative movement between said engaging surfaces to lock the load in any position, the relative movement between said irregular surface and said rotatable surface effecting an indexing of the movement of said locking member.

21. A brake lever assembly or the like comprising a frame having spaced bearing surfaces, locking means engaging said surfaces, operating means effecting movement of said locking means relative to said surfaces, portions of said means engaging said surfaces being irregular to effect an indexing of said means upon movement relative to said surfaces, means adapted to be operatively connected with the actuated load, said last means having connections with said locking means urging the same under stress of the load to a seat in said frame resisting movement by the load, whereby the load is locked in any position of rotation of the locking means by the operating means.

CLARENCE M. ELLENBERGER.